United States Patent
Maruyama

(10) Patent No.: US 9,657,165 B2
(45) Date of Patent: May 23, 2017

(54) POLYPROPYLENE RESIN COMPOSITION AND MOLDED ARTICLE

(71) Applicant: Sumitomo Chemical Company, Limited, Tokyo (JP)

(72) Inventor: Toshiya Maruyama, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/385,686

(22) PCT Filed: Mar. 18, 2013

(86) PCT No.: PCT/JP2013/058472
§ 371 (c)(1),
(2) Date: Sep. 16, 2014

(87) PCT Pub. No.: WO2013/141398
PCT Pub. Date: Sep. 26, 2013

(65) Prior Publication Data
US 2015/0087786 A1 Mar. 26, 2015

(30) Foreign Application Priority Data

Mar. 19, 2012 (JP) ................. 2012-061541

(51) Int. Cl.
*C08L 23/12* (2006.01)
*C08L 23/14* (2006.01)

(52) U.S. Cl.
CPC .............. *C08L 23/12* (2013.01); *C08L 23/14* (2013.01); *C08L 2205/025* (2013.01); *C08L 2205/03* (2013.01)

(58) Field of Classification Search
CPC .......... C08L 23/12; C08L 23/14; C08L 23/08; C08L 2205/02; C08L 2205/025; C08L 2205/03; C08L 2205/04
See application file for complete search history.

(56) References Cited

U.S. PATENT DOCUMENTS

| 5,438,091 A | 8/1995 | Saito et al. |
| 2002/0119268 A1 | 8/2002 | Gakuji et al. |
| 2009/0270561 A1 | 10/2009 | Ohtani et al. |

FOREIGN PATENT DOCUMENTS

| EP | 2738216 A1 * | 6/2004 |
| JP | H09-3294 A | 1/1997 |
| JP | H09-40821 A | 2/1997 |
| JP | 2001-098139 A | 4/2001 |
| JP | 2001-114954 A | 4/2001 |
| JP | 2008-045037 A | 2/2008 |
| JP | 2008-208304 A | 9/2008 |
| JP | 2010-121054 A | 6/2010 |
| JP | 2011-021124 A | 2/2011 |

OTHER PUBLICATIONS

Int'l Search Report issued Jun. 25, 2013 in Int'l Application No. PCT/JP2013/058472.

* cited by examiner

Primary Examiner — Irina S Zemel
Assistant Examiner — Jeffrey Lenihan
(74) Attorney, Agent, or Firm — Panitch Schwarze Belisario & Nadel LLP

(57) ABSTRACT

A polypropylene resin composition affords a molded article good in rigidity, impact resistance, and tensile elongation at break. This composition contains 75-98 wt % of a propylene-based material (A) and 2-25 wt % of a propylene-ethylene random copolymer (B). Material (A) contains 50-100 wt % of a polymeric material (A-1) produced by multistage polymerization and composed of a propylene homopolymer component (i) and a propylene-ethylene random copolymer component (ii), and 0-50 wt % of a propylene homopolymer (A-2). The content of (i) in material (A-1) is 55-90 wt %, and the content of (ii) is 10-45 wt %, (ii) in material (A-1) contains >40 wt % but ≤80 wt % of ethylene units and ≥20 wt % but <60 wt % of propylene units, and the content of (ii) in material (A) is 5-35 wt %. Copolymer (B) contains 88-95 wt % of propylene units and 5-12 wt % of ethylene units and has an MFR of 0.5-10 g/10 minutes measured at 230° C. and a load of 2.16 kgf.

4 Claims, No Drawings

POLYPROPYLENE RESIN COMPOSITION AND MOLDED ARTICLE

CROSS-REFERENCE-RELATED APPLICATION

This application is a Section 371 of International Application No. PCT/JP2013/058472, filed Mar. 18, 2013, which was published in the Japanese language on Sep. 26, 2013, under International Publication No. WO 2013/141398 A1, and the disclosure of which is incorporated herein by reference.

TECHNICAL FIELD

The present invention relates to polypropylene resin compositions and molded articles made thereof. Particularly, the present invention relates to a polypropylene resin composition capable of affording a molded article being well balanced with respect to impact resistance and tensile elongation at break, and a molded article made thereof.

BACKGROUND ART

Polypropylene resin compositions are in use for automotive interior or exterior parts, electric parts, etc. because they are materials generally being excellent in rigidity, impact resistance, etc.

Patent document 1 discloses a polypropylene resin composition developed for the purpose of improving molding processability, mechanical strength balance, and paintability which is a composition composed of a propylene-ethylene block copolymer, an ethylene-α-olefin copolymer rubber, and an inorganic filler, wherein the propylene-ethylene block copolymer component is composed of a propylene homopolymer portion, a propylene-ethylene random copolymer portion, and an ethylene homopolymer portion, and the propylene-ethylene random copolymer portion has a number average molecular weight of $20 \times 10^4$ or more and a weight average molecular weight of $60 \times 10^4$ or more.

Patent document 2 discloses a polypropylene resin composition developed for the purpose of improving rigidity, heat resistance, hardness, moldability, impact resistance, and surface gloss of a molded article, the polypropylene resin composition being composed of a propylene polymer having a melt flow rate of 10 to 400 g/10 minutes and containing 0.1 to 20% by weight of a component soluble in n-decane at room temperature, wherein the component soluble in n-decane at room temperature has an intrinsic viscosity of 0.2 to 10 dl/g and a component insoluble in n-decane at room temperature has a pentad isotacticity of 0.95 or more, a propylene-ethylene random copolymer containing 50 to 90 mol % of units derived from propylene and having an intrinsic viscosity of 1 to 4 dl/g and a molecular weight distribution Mw/Mn of 1.5 to 3.5, an ethylene-α-olefin copolymer containing 50 mol % or more of units derived from ethylene, and an inorganic filler.

Patent document 3 discloses a polypropylene composition developed for the purpose of improving moldability, rigidity, hardness, impact resistance, and balance therebetween of automotive parts, the polypropylene composition comprising 60 to 72% by weight of a propylene-ethylene block copolymer, 11 to 19% by weight of an ethylene-octene copolymer, and 17 to 23% by weight of talc, wherein the propylene-ethylene block copolymer portion contains a component insoluble in xylene at room temperature, the insoluble component having a steroregularity index of 98.0 mol % or more measured by $^{13}$C-NMR, the content of ethylene units in the insoluble component being 2% by weight or less, and the propylene-ethylene block copolymer portion contains 15 to 26% by weight of a component soluble in xylene at room temperature, the content of ethylene units in the soluble component being 50 to 85% by weight, the ash content being 16 to 23% by weight, the melt index (measured at 230° C. and 2.16 kgf) being 25 g/10 min or more, the Rockwell hardness being 70 or more, and the Izod impact strength being 450 J/m or more.

PRIOR ART DOCUMENTS

Patent Documents

Patent Document 1: JP-A-5-331347
Patent Document 2: JP-A-9-40821
Patent Document 3: JP-A-2001-98139

SUMMARY OF THE INVENTION

Problems to be Solved by the Invention

In the fields of automotive interior or exterior parts, etc., however, molded articles of the polypropylene resin compositions disclosed in the above-cited publications have been requested to improve in tensile elongation at break.

Under such circumstances, the object of the present invention is to provide a polypropylene resin composition capable of affording a molded article good in rigidity, impact resistance and tensile elongation at break, and a molded article made thereof.

Means for Solving the Problems

The present invention relates, in a first aspect, to a polypropylene resin composition comprising 75 to 98% by weight of a propylene-based material (A) defined below and 2 to 25% by weight of a propylene-ethylene random copolymer (B) defined below, where the combined amount of the propylene-based material (A) and the propylene-ethylene random copolymers (B) is taken as 100% by weight, the propylene-based material (A) is a material comprising 50 to 100% by weight of a propylene-based polymeric material (A-1) produced by multistage polymerization and composed of a propylene homopolymer component (i) and a propylene-ethylene random copolymer component (ii), and 0 to 50% by weight of a propylene homopolymer (A-2) (the total amount of the propylene-based polymeric material (A-1) and the propylene homopolymer (A-2) is taken as 100% by weight), the propylene-based polymeric material (A-1) satisfies the following requirements (1) and (2), and the content of the propylene-ethylene random copolymer component (ii) in the propylene-based material (A) is 5 to 35% by weight, requirement (1):

the content of the propylene homopolymer component (i) in the propylene-based polymeric material (A-1) is chosen from the range of 55 to 90% by weight and the content of the propylene-ethylene random copolymer component (ii) is chosen from the range of 10 to 45% by weight (the sum total of the content of propylene polymer component (i) and the content of propylene-ethylene random copolymer component (ii) is taken as 100% by weight), requirement (2):

the propylene-ethylene random copolymer component (ii) of the propylene-based polymeric material (A-1) comprises more than 40% by weight but not more than 80% by weight of monomer units derived from ethylene and not less than 20% by weight but less than 60% by weight of monomer units derived from propylene (the overall weight of the propylene-ethylene random copolymer component (ii) is taken as 100% by weight), the propylene-ethylene random copolymer (B) comprises 88 to 95% by weight of monomer units derived from propylene and 5 to 12% by weight of monomer units derived from ethylene (the overall weight of the propylene-ethylene random copolymer component (B) is taken as 100% by weight), wherein the melt flow rate measured at a temperature of 230° C. and a load of 2.16 kgf is 0.5 to 10 g/10 minutes.

The present invention relates, in a second aspect, to a molded article made of the above polypropylene resin composition.

Effect of the Invention

According to the present invention, it is possible to obtain a polypropylene resin composition capable of affording a molded article good in rigidity, impact resistance and tensile elongation at break, as well as a molded article good in rigidity, impact resistance and tensile elongation at break.

Mode for Carrying Out the Invention

The present invention is directed to a polypropylene resin composition comprising 75 to 98% by weight of a propylene-based material (A) and 2 to 25% by weight of a propylene-ethylene random copolymer (B) (the total amount of the propylene-based material (A) and the propylene-ethylene random copolymer (B) is taken as 100% by weight).

The content of the propylene-based material (A) contained in the polypropylene resin composition of the present invention is 98 to 75% by weight, and the content of the propylene-ethylene random copolymer (B) is 2 to 25% by weight. Preferably, from the viewpoint of the rigidity, impact strength, and tensile elongation at break of a product, the content of the propylene-based material (A) is 95 to 75% by weight and the content of the propylene-ethylene random copolymer (B) is 5 to 25% by weight. More preferably, the content of the propylene-based material (A) is 95 to 80% by weight and the content of the propylene-ethylene random copolymer (B) is 5 to 20% by weight. Even more preferably, the content of the propylene-based material (A) is 95 to 85% by weight and the content of the propylene-ethylene random copolymer (B) is 5 to 25% by weight. The total amount of the propylene-based material (A) and the propylene-ethylene random copolymer (B) is taken as 100% by weight.

The propylene-based material (A) to be used for the present invention is a material composed of 50 to 100% by weight of a propylene-based polymeric material (A-1) and 0 to 50% by weight of a propylene homopolymers (A-2) produced by multi-stage polymerization (the total amount of the propylene-based polymeric material (A-1) and the propylene homopolymer (A-2) is taken as 100% by weight). The content of the propylene homopolymer (A-2) is preferably 0 to 40% by weight, more preferably 0 to 30% by weight.

The propylene-based polymeric material (A-1) to be used for the present invention is composed of a propylene homopolymer component (i) and a propylene-ethylene random copolymer component (ii) produced by multi-stage polymerization.

From the viewpoint of the moldability and impact resistance of a product, the melt flow rate (measured at a temperature of 230° C. and a load of 2.16 kgf) of the propylene-based polymeric material (A-1) to be used for the present invention is preferably 10 to 150 g/10 minutes, more preferably 15 to 80 g/10 minutes. The term "melt flow rate" is hereinafter abbreviated as MFR.

From the viewpoint of rendering good the rigidity, hardness, moldability, toughness and impact resistance of a product, the content of the propylene homopolymer component (i) in the propylene-based polymeric material (A-1) to be used for the present invention is chosen within the range of 55 to 90% by weight and the content of the propylene-ethylene random copolymer component (ii) is chosen from the range of 10 to 45% by weight (the sum total of the content of the propylene homopolymer component (i) and the content of the propylene-ethylene random copolymer component (ii) is taken as 100% by weight). Preferably, the content of the propylene homopolymer component (i) is chosen from the range of 60 to 90% by weight and the content of the propylene-ethylene random copolymer component (ii) is chosen from the range of 10 to 40% by weight, and more preferably, the content of the propylene homopolymer component (i) is chosen from the range of 70 to 85% by weight and the content of the propylene-ethylene random copolymer component (ii) is chosen from the range of 15 to 30% by weight.

The propylene homopolymer component (i) is a propylene polymer component containing 99 mol % or more of monomer units derived from propylene (the sum total of all the monomer units which the propylene polymer component contains is taken as 100 mol %), and it may contain 1 mol % or less of at least one sort of monomer units selected from the group consisting of monomer units derived from ethylene and monomer units derived from α-olefins having 4 or more carbon atoms. Examples of the propylene homopolymer component (i) include a propylene homopolymer or a copolymer of propylene with at least one sort of olefin selected from the group consisting of ethylene and α-olefins having 4 or more carbon atoms.

From the viewpoint of the rigidity, heat resistance or hardness of a product, the propylene homopolymer component (i) is preferably a propylene homopolymer component having a content of monomer units derived from propylene of 100 mol %, more preferably a propylene propylene homopolymer component having an isotactic pentad fraction of 0.97 or more, and even more preferably a propylene homopolymer component having an isotactic pentad fraction of 0.98 or more.

From the viewpoint of the flowability at the time of melting of a composition and the toughness of a molded article, the intrinsic viscosity ($[\eta]P$) of the propylene homopolymer component (i) is preferably 0.7 to 1.3 dl/g and more preferably 0.85 to 1.1 dl/g.

The molecular weight distribution of the propylene homopolymer component (i) measured by gel permeation chromatography (GPC) is preferably 3 to 7 and more preferably 3 to 5. The molecular weight distribution is herein the ratio (Mw/Mn) of the weight average molecular weight (Mw) to the number average molecular weight (Mn).

The propylene-ethylene random copolymer component (ii) comprises monomer units derived from propylene and monomer units derived from ethylene, wherein the content of the monomer units derived from ethylene is more than 40% by weight but 80% by weight and the content of the monomer units derived from propylene is not less than 20% by weight but less than 60% by weight (the overall weight of the propylene-ethylene random copolymer component (ii) is taken as 100% by weight). From the viewpoint of rendering good the rigidity, impact resistance, and tensile elongation at break of a product, the content of the monomer units derived from ethylene is preferably 45% by weight to 70% by weight and the content of the monomer units derived from propylene is preferably 30% by weight to 55% by weight.

From the viewpoint of rendering good the rigidity, impact resistance, and tensile elongation at break of a product, the intrinsic viscosity ([η]EP) of the propylene-ethylene random copolymer component (ii) is preferably 2.0 dl/g to 8.0 dl/g, and more preferably 2.5 dl/g to 6.0 dl/g.

The propylene homopolymer (A-2) to be used for the present invention is preferably a homopolymer having an isotactic pentad fraction of 0.97 or more, and more preferably a homopolymer having an isotactic pentad fraction of 0.98 or more.

The MFR measured at a temperature of 230° C. and a load of 2.16 kgf of the propylene homopolymer (A-2) to be used for the present invention is usually 1 to 500 g/10 minutes, preferably 10 to 350 g/10 minutes.

The propylene homopolymer (A-2) is a propylene polymer containing 99 mol % or more of monomer units derived from propylene, where the sum total of all the monomer units which the propylene polymer contains is taken as 100 mol %, and it may contain 1 mol % or less of at least one sort of monomer units selected from the group consisting of monomer units derived from ethylene and monomer units derived from α-olefins having 4 or more carbon atoms. Examples of the propylene homopolymer (A-2) include a propylene homopolymer or a copolymer of propylene with at least one sort of olefin selected from the group consisting of ethylene and α-olefins having 4 or more carbon atoms.

From the viewpoint of the rigidity, heat resistance or hardness of a product, the propylene homopolymer (A-2) is preferably a propylene homopolymer component having a content of monomer units derived from propylene of 100 mol %, more preferably a propylene propylene homopolymer component having an isotactic pentad fraction of 0.97 or more, and even more preferably a propylene homopolymer component having an isotactic pentad fraction of 0.98 or more.

From the viewpoint of the flowability at the time of melting of a composition and the toughness of a molded article, the intrinsic viscosity ([η]P*) of the propylene homopolymer (A-2) is preferably 0.7 to 1.3 dl/g, and more preferably 0.85 to 1.1 dl/g.

The molecular weight distribution of the propylene homopolymer (A-2) measured by gel permeation chromatography (GPC) is preferably 3 to 7, and more preferably 3 to 5. The molecular weight distribution is herein the ratio (Mw/Mn) of the weight average molecular weight (Mw) to the number average molecular weight (Mn).

The propylene-ethylene random copolymer (B) to be used for the present invention contains 88 to 95% by weight of monomer units derived from propylene and 5 to 12% by weight of monomer units derived from ethylene, where the overall weight of the propylene-ethylene random copolymer component (B) is taken as 100% by weight. From the viewpoint of the rigidity, impact strength, and tensile elongation at break of a product, the content of the monomer units derived from propylene is preferably 90 to 94% by weight and the content of the monomer units derived from ethylene is preferably 6 to 10% by weight.

The MFR measured at a temperature of 230° C. and a load of 2.16 kgf of the propylene-ethylene random copolymer (B) to be used for the present invention is 0.5 to 10 g/10 minutes from the viewpoint of the gloss, impact strength, and tensile elongation at break of a product.

The density of the propylene-ethylene random copolymer (B) is preferably 0.87 to 0.88 g/cm$^3$ from the viewpoint of the rigidity, impact strength, and tensile elongation at break of a product.

The polypropylene resin composition of the present invention may contain one or more sorts of ethylene-α-olefin copolymer rubber in order to improve balance of mechanical properties of a product. From the viewpoint of the impact strength and rigidity of a product, the content of the ethylene-α-olefin copolymer rubber is preferably 1 to 30 parts by weight, more preferably 3 to 25 parts by weight, and even more preferably 5 to 22 parts by weight relative to 100 parts by weight of the total amount of the propylene-based material (A) and the propylene-ethylene random copolymer (B). The ethylene-α-olefin copolymer rubber to be used for the present invention contains monomer units derived from an α-olefin having 4 to 12 carbon atoms and monomer units derived from ethylene and have a density is 0.85 to 0.89 g/cm$^3$ and an MFR measured at a temperature of 230° C. and a load of 2.16 kgf of 0.1 to 20 g/10 minutes. Examples of the α-olefin having 4 to 12 carbon atoms include butene-1, pentene-1, hexene-1, heptene-1, octene-1, and decene; butene-1, hexene-1, and octene-1 are preferred.

From the viewpoint of enhancing the low-temperature impact strength of a product, the content of the monomer units derived from the α-olefin contained in the ethylene-α-olefin copolymer rubber is usually 20 to 50% by weight, and more preferably 24 to 50% by weight where the overall weight of the ethylene-α-olefin copolymer rubber is taken as 100% by weight.

Examples of the ethylene-α-olefin copolymer rubber include an ethylene-butene-1 random copolymer rubber, an ethylene-hexene-1 random copolymer rubber, and an ethylene-octene-1 random copolymer rubber; an ethylene-octene-1 random copolymer rubber and an ethylene-butene-1 random copolymer rubber are preferred.

The polypropylene resin composition of the present invention may contain one or more sorts of inorganic filler in order to improve the rigidity of a product. From the viewpoint of the impact strength and rigidity of a product, the content of such an inorganic filler is preferably 1 to 30 parts by weight, more preferably 3 to 25 parts by weight, and even more preferably 5 to 22 parts by weight relative to 100 parts by weight of the total amount of the propylene-based material (A) and the propylene-ethylene random copolymer (B).

Examples of the inorganic filler to be used for the present invention include calcium carbonate, barium sulfate, mica, crystalline calcium silicate, talc, and magnesium sulfate fiber; talc or magnesium sulfate fiber is preferable, and talc is more preferable.

Talc to be used as the inorganic filler is preferably hydrous magnesium silicate that has been ground. The crystal structure of the molecule of hydrous magnesium silicate is a pyrophyllite-type three-layer structure. Talc is a compound composed of lamination of this structure. More preferable talc is one in a tabular form prepared by finely grinding crystals of hydrous magnesium silicate into a size almost as small as unit layers.

When the inorganic filler is in the form of particles, the average particle diameter of the inorganic filler is preferably 3 μm or less. The average particle diameter of talc means a 50% equivalent particle diameter D50 which is determined from an integral distribution curve by the sub-sieve method which is measured by suspending it in a dispersing medium, such as water or alcohol, by use of a centrifugal sedimentation type particle size distribution analyzer.

The inorganic filler may be used either without having been subjected to any treatment or with having been treated on its surface with a various conventional surfactant for the improvement in the interfacial adhesiveness with the propylene-based material (A) or the dispersibility to the propylene-based material (A). Examples of such a surfactant include silane coupling agents, titanium coupling agents, higher fatty acids, higher fatty acid esters, higher fatty acid amides, and higher fatty acid salts.

The average fiber length of magnesium sulfate fiber to be used as the inorganic filler is preferably 5 to 50 μm, and more preferably 10 to 30 μm. The average fiber diameter of the magnesium sulfate fiber is preferably 0.3 to 2 μm, and more preferably 0.5 to 1 μm.

The polypropylene resin composition of the present invention may contain various additives as necessary. Examples of such additives include antioxidants, UV absorbers, lubricants, pigments, antistatic agents, copper inhibitors, flame retardants, neutralizers, foaming agents, plasticizers, nucleating agents, antifoamants, and crosslinking agents. In order to improve heat resistance, weather resistance, and oxidative stability, the polypropylene resin composition preferably contains an antioxidant or a UV absorber.

The method for producing the polypropylene resin composition of the present invention may be a method comprising melt-kneading the components to constitute the composition, for example, a method that is performed using a kneading machine such as a single screw extruder, a twin screw extruder, a Banbury mixer, and a hot roll. The kneading temperature is usually 170 to 250° C., and the kneading time is usually 1 to 20 minutes. Mixing of the components may be performed either simultaneously or sequentially.

The propylene-based material (A) is a material composed of 50 to 100% by weight of a propylene-based polymeric material (A-1) composed of a propylene homopolymer component (i) and a propylene-ethylene random copolymer component (ii) and 0 to 50% by weight of a propylene homopolymer (A-2), where the sum total of the propylene-based polymeric material (A-1) and the propylene homopolymer (A-2) is taken as 100% by weight. The method for producing the propylene-based material (A) of the present invention may be a method comprising melt-kneading the components to constitute the material, for example, a method using a kneading machine such as a single screw extruder, a twin screw extruder, a Banbury mixer, and a hot roll. The kneading temperature is usually from 170 to 250° C., and the kneading time is usually from 1 to 20 minutes. Mixing of the components may be performed either simultaneously or sequentially.

One example of a method for producing the propylene-based polymeric material (A-1) to be used for the present invention is a method to produce it by multistage polymerization with a publicly known polymerization method using a publicly known catalyst. One example of such a publicly known catalyst is a catalyst obtained by bringing a solid catalyst component (a) containing magnesium, titanium, halogen and an electron donor, an organoaluminum compound (b), and an electron donor component (c) into contact with each other. Examples of a method for producing this catalyst include the methods disclosed in JP-A-1-319508, JP-A-7-216017, JP-A-10-212319, etc.

Examples of the polymerization method to produce the propylene-based polyeric material (A-1) to be used for the present invention include a method comprising at least two polymerization steps, wherein the propylene homopolymer component (i) is produced in the first step and then the propylene-ethylene random copolymer component (ii) having a content of monomer units derived from ethylene of more than 40% by weight but not more than 80% by weight is produced in the second step.

Examples of the polymerization method include bulk polymerization, solution polymerization, slurry polymerization, and vapor phase polymerization. Such polymerization methods can be performed either in a batch system or in a continuous system and may be combined appropriately. From the viewpoint of being industrially and economically advantageous, vapor phase polymerization in a continuous system and bulk polymerization-vapor phase polymerization in a continuous system are preferred.

One example of a more specific method for producing of the propylene-based polymeric material (A-1) is a method using a polymerization apparatus comprising at least two polymerization vessels arranged in series, wherein a propylene homopolymer component (i) is produced in the first polymerization vessel in the presence of a catalyst comprising a solid catalyst component (a), an organoaluminum compound (b), and an electron donor component (c), the propylene homopolymer component (i) obtained in the first polymerization vessel and the catalyst accompanying thereto are transferred to the second polymerization vessel, and then a propylene-ethylene random copolymer component (ii) is produced in the second polymerization vessel in the presence of the propylene homopolymer component (i) and the catalyst accompanying thereto.

The amounts of the solid catalyst component (a), the organoaluminum compound (b) and the electron donating component (c) used in the aforementioned polymerization methods and the method for feeding the catalyst components into polymerization vessels may be determined appropriately with reference to a method of using a conventional catalyst.

The polymerization temperature in the above-described polymerization method is usually 0 to 300° C., and preferably 20 to 180° C. The polymerization pressure is usually normal pressure to 10 MPa and preferably 0.2 to 5 MPa. Hydrogen, for example, may be used as a molecular weight regulator.

In the production of the propylene-based polymeric material (A-1) to be used for the present invention, preliminary polymerization may be performed by a method known in the art before performing main polymerization. One example of the preliminary polymerization method known in the art is a method in which preliminary polymerization is performed in a slurry state using a solvent by feeding a small amount of propylene in the presence of a solid catalyst component (a), an organoaluminum compound (b), and an electron donor component (c).

The propylene-based polymeric material (A-1) to be used for the present invention may be a polymer produced by the production method described above as well as may be a polymeric material produced by adding peroxide to a polymeric material produced by the production method described above and then melt-kneading the mixture to perform decomposition treatment.

An organic peroxide is generally used as the peroxide, and examples of such an organic peroxide include alkyl peroxides, diacyl peroxides, peroxyesters, and peroxycarbonates.

Examples of the alkyl peroxides include dicumyl peroxide, di-tert-butyl peroxide, tert-butyl cumyl peroxide, 2,5-dimethyl-2,5-bis(tert-butylperoxy)hexane, 2,5-dimethyl-2,5-bis(tert-butylperoxy)-3-hexyne, 1,3-bis(tert-butylperoxyisopropyl)benzene, and 3,6,9-triethyl-3,6,9-trimethyl-1,4,7-triperoxonane.

Examples of the diacyl peroxides include benzoyl peroxide, lauroyl peroxide, and decanoyl peroxide.

Examples of the peroxyesters include 1,1,3,3-tetramethylbutyl peroxyneodecanoate, α-cumyl peroxyneodecanoate, tert-butyl peroxyneodecanoate, tert-butyl peroxyneoheptanoate, tert-butyl peroxypivalate, tert-hexyl peroxypivalate, 1,1,3,3-tetramethylbutyl peroxy-2-ethylhexanoate, tert-amyl peroxyl-2-ethylhexanoate, tert-butyl peroxy-2-ethylhexanoate, tert-butyl peroxyisobutyrate, di-tert-butyl peroxyhexahydroterephthalate, tert-amyl peroxy-3,5,5-trimethylhexanoate, tert-butyl peroxy-3,5,5-trimethyl hexanoate, tert-butyl peroxyacetate, tert-butyl peroxybenzoate, and di-butyl peroxytrimethyladipate.

Examples of the peroxycarbonates include di-3-methoxybutyl peroxydicarbonate, di(2-ethylhexyl) peroxydicarbonate, di isopropyl peroxycarbonate, tert-butyl peroxyisopropylcarbonate, di(4-tert-butylcyclohexyl) peroxydicarbonate, dicetyl peroxydicarbonate, and dimyristyl peroxydicarbonate.

One example of a method for producing the propylene homopolymer (A-2) to be used for the present invention is a method to produce it by a publicly known polymerization method using a publicly known catalyst. Examples of such a publicly known catalyst include the catalysts to be used for the production of the above-described propylene-based polymeric material (A-1). Examples of the polymerization method include bulk polymerization, solution polymerization, slurry polymerization, and vapor phase polymerization.

One example of a method for producing the propylene-ethylene random copolymer (B) to be used for the present invention is a method to produce it by copolymerizing propylene with ethylene using a publicly known catalyst and a publicly known polymerization method.

Examples of such a publicly known catalyst include a catalyst composed of a vanadium compound and an organoaluminum compound, a Ziegler Natta catalyst, or a metallocene catalyst, and examples of such a publicly known polymerization method include a solution polymerization method, a slurry polymerization method, a high pressure ion polymerization method, or a vapor phase polymerization method. A specific method for producing the propylene-ethylene random copolymer (B) is described in, for example, WO 1999/029749.

Examples of a method for producing the ethylene-α-olefin copolymer rubber include methods the same as the methods for producing the above-described propylene-ethylene random copolymer (B).

Examples of the molded article of the present invention include an injection molded article, a compression molded article, and an extrusion formed article; an injection molded article is preferable. Said injection molded article is an injection molded article produced by injection molding the polypropylene resin composition of the present invention by an injection molding method.

Preferable applications of the injection molded article of the present invention are components for automobiles, such as door trims, pillars, instrument panels and bumpers.

EXAMPLES

[Methods for Measuring Physical Properties]

The methods used in Examples and Comparative Examples for measuring physical properties of polymers, compositions and molded articles are described below.

(1) Contained proportions (% by weight) of propylene homopolymer component (i) and propylene-ethylene random copolymer component (ii) contained in propylene-based polymeric material (A-1):

In a propylene-based polymeric material (A-1), the weight ratio X of the propylene-ethylene random copolymer component (ii) to the propylene-based polymeric material (A-1) is determined by measuring the amounts of heat of crystal fusion of the propylene homopolymer component (i) and the propylene-based polymeric material (A-1) and then calculating the ratio from the following equation.

$$X = 1 - (\Delta Hf)T/(\Delta Hf)P$$

(ΔHf)T: the amount of heat of fusion (cal/g) of the propylene-based polymeric material (A-1)

(ΔHf)P: the amount of heat of fusion (cal/g) of the propylene homopolymer component (i)

The ethylene content of the propylene-ethylene random copolymer component (ii) can be determined by measuring the ethylene content in % by weight of the propylene-based polymeric material (A-1) by infrared absorption spectrometry and then calculating the content from the following equation.

$$(C2')EP = (C2')T/X$$

(C2')T: the ethylene content (% by weight) of the propylene-based polymeric material (A-1)

(C2')EP: the ethylene content (% by weight) of the propylene-ethylene random copolymer component (ii)

(3) Density (Unit: g/cm$^3$)

The density of a polymeric material was measured in accordance with the method specified in ASTM D792.

(4) MFR (Unit: g/10 Minutes)

The MFR of a polymeric material was measured by the method described in ASTM D1238. The MFR was measured at a temperature of 230° C. under a load of 2.16 kg unless otherwise stated.

(5) Intrinsic Viscosity ([η], Unit: dl/g)

Reduced viscosity was measured at three concentrations 0.1 g/dl, 0.2 g/dl and 0.5 g/dl in Tetralin at 135° C. by using an Ubbelohde's viscometer. Intrinsic viscosity was then calculated using the calculation method described in "Kobunshi Yoeki (Polymer Solution), Kobunshi Jikkengaku (Polymer Experiment Study) Vol. 11" page 491 (published by Kyoritsu Shuppan Co., Ltd., 1982), specifically, by an extrapolation method in which reduced viscosities are plotted against concentrations and the concentration is extrapolated in zero.

The intrinsic viscosities ([η]Total, [η]P, and [η]EP) of the propylene-based polymeric material (A-1), the propylene homopolymer component (i), and the propylene-ethylene random copolymer component (ii) were measured or calculated in the following manner.

From the intrinsic viscosity ([η]P) of the propylene homopolymer component (i) obtained in the former polymerization step, the intrinsic viscosity ([η]Total) of the propylene-based polymeric material (A-1) composed of the propylene homopolymer component (i) and the propylene-ethylene random copolymer component (ii) obtained in the latter polymerization step, and the contained proportion of the propylene-ethylene random copolymer component (ii) to the propylene-based polymeric material (A-1), the intrinsic viscosity [η]EP of the propylene-ethylene random copolymer component (ii) polymerized in the latter step was determined by calculation using the following equation.

$$[\eta]EP=\{[\eta]Total-[\eta]P\times(1-X)\}/X$$

[η]Total: the intrinsic viscosity (dl/g) of the polymeric material finally obtained via the polymerization step of the later stage

[η]P: the intrinsic viscosity (dl/g) of the polymer component extracted from a polymerization vessel after the polymerization step of the earlier stage X: contained proportion of the propylene-ethylene random copolymer component (ii) to the propylene-based polymeric material (A-1)

(6) Isotactic Pentad Fraction

The isotactic pentad fraction is the percentage of isotactic chains being in the form of a pentad unit and being contained in polypropylene molecular chains relative to the entire of the polypropylene molecular chains, in other words, the percentage of monomer units derived from propylene each located in the center of a chain in which five monomer units derived from propylene are meso-bonded successively relative to the entire of the polypropylene molecular chains. The measurement of an isotactic pentad fraction is performed by the measurement method using $^{13}$C-NMR described by A. Zambelli et al. in Macromolecules, 6, 925 (1973), and NMR absorption peaks measured are assigned on the basis of Macromolecules, 8, 687 (1975). Specifically, an isotactic pentad fraction is measured as the ratio of the area of the peak of monomer units derived from propylene and each located at the center of a chain in which five monomer units derived from propylene are meso-bonded successively relative to the area of all absorption peaks located within the methyl carbon region of a $^{13}$C-NMR spectrum. In accordance with this method, the isotactic pentad fraction of an NPL standard substance, CRM No. M19-14 Polypropylene PP/MWD/2 available from NATIONAL PHYSICAL LABORATORY, G.B. was measured to be 0.944.

(7) Tensile Elongation at Break (UE) (Unit: %)

Tensile elongation at break was measured in accordance with the method described in ASTM D638. Specifically, using a specimen 3.2 mm in thickness prepared by the method for producing an injection molded article described below, tensile elongation at break was measured at a tensile speed of 50 mm/minute or 10 mm/minute.

(8) Flexural Modulus (FM) (Unit: MPa)

Flexural modulus was measured in accordance with the method described in ASTM D790. Specifically, using a specimen 6.4 mm in thickness and 100 mm in span length produced by the method for producing an injection molded article described below, flexural modulus was measured at a loading rate of 2.5 mm/minute and a measurement temperature of 23° C.

(9) Izod Impact Strength (Izod) (Unit: kJ/cm$^2$)

Izod impact strength was measured in accordance with the method described in ASTM D256. Specifically, Izod impact strength was measured at 23° C. and −30° C. using a notched specimen 6.4 mm in thickness produced by the below-described method for producing an injection molded article and notched after molding.

[Method for Producing an Injection Molded Article]

Specimens, i.e., injection molded articles, for the physical property evaluations of (7) to (9) shown above were produced by injection molding at a molding temperature of 220° C., a mold cooling temperature of 50° C., an injection time of 15 seconds, and a cooling time of 20 seconds using an injection molding machine SE130DU manufactured by Sumitomo Heavy Industries, Ltd.

[Materials]

The materials used in Examples and Comparative Examples are shown below.

[Propylene-Based Polymeric Material (A-1)]

(1) BCPP-1

<Physical Properties of BCPP-1>

Content of propylene homopolymer component (i): 80.4% by weight

Content of monomer units derived from propylene in propylene homopolymer component (i): 100 mol %

Intrinsic viscosity of propylene homopolymer component (i) ([η]): 0.95 dl/g

Content of propylene-ethylene random copolymer component (ii): 19.6% by weight

Content of monomer units derived from ethylene contained in propylene-ethylene random copolymer component (ii): 50.0% by weight Content of monomer units derived from propylene contained in propylene-ethylene random copolymer component (ii): 50.0% by weight Intrinsic viscosity of propylene-ethylene random copolymer component (ii) ([η]EP): 5.5 dl/g MFR of propylene-based polymeric material (A-1): 23.6 g/10 minutes <Method for Producing BCPP-1>

Heptane having been fully dehydrated and degassed, triethylaluminum (henceforth abbreviated as TEA) and tertiary-butyl-n-propyldimethoxysilane (henceforth abbreviated as tBnPDMS) were charged into a polymerization vessel so that the concentration of TEA might be 0.0034 mmol/L and the amount of tBnPDMS per mol of TEA might be 0.15 mol, and then heating was started. When the temperature had been increased to 75° C., heating was stopped, the temperature within the polymerization vessel was maintained at 75° C., and the solid catalyst component I disclosed in an example of JP-A-10-212319 (also published as U.S. Pat. No. 6,187,883B1) was charged into the polymerization vessel so that the molar ratio of the TEA content and the content of Ti contained in the catalyst component might be [TEA]/Ti=0.14 (mol/mol), and subsequently, hydrogen was fed so that the hydrogen concentration within the polymerization vessel might be 13.0% by volume. Subsequently, polymerization was carried out for about 2 hours under continuous feeding of propylene into the polymerization vessel so that the generated amount of a propylene polymer component per gram of the mass of the solid catalyst component I might be 3700 g. Thus, a propylene homopolymer component (i) was obtained. The intrinsic viscosities [η]P of the propylene polymer component (i) was 0.95 dl/g.

Subsequently, degassing was carried out and then replacement with propylene was carried out three times to remove hydrogen from the system. Then, while the temperature within the polymerization vessel was kept at 50° C. and the pressure was kept at 3.0 MPa, polymerization was carried out under continuous feeding of ethylene and propylene so that the ethylene concentration and the propylene concentration might be kept at 75% by volume and 25% by volume, respectively. Thus, a propylene-ethylene random copolymer component (ii) was produced. Polymerization was stopped when the generated amount of the propylene-ethylene random copolymer component (ii) had become about 17% by weight where the generated amount of the propylene-based polymeric material (A-1) was taken as 100% by weight. Then, the resulting propylene-based polymeric material (A-1) was collected. The generated amount of the propylene-based polymeric material (A-1) per gram of the mass of the solid catalyst component I was 4530 g, the content of monomer units derived from ethylene contained in the propylene-ethylene random copolymer component (ii) was 49% by weight, the intrinsic viscosities [η]Total of the propylene-based polymeric material (A-1) was 1.85 dl/g, and the yield of the propylene-based polymeric material (A-1) was about 800 kg.

(2) BCPP-2
<Physical Properties of BCPP-2>
Content of propylene homopolymer component (i): 66.8% by weight
Content of monomer units derived from propylene in propylene-homopolymer component (i): 100 mol %
Intrinsic viscosity of propylene homopolymer component (i) ([η]P): 0.87 dl/g
Content of propylene-ethylene random copolymer component (ii): 33.2% by weight
Content of monomer units derived from ethylene contained in propylene-ethylene random copolymer component (ii): 51.2% by weight
Content of monomer units derived from propylene contained in propylene-ethylene random copolymer component (ii): 48.8% by weight
Intrinsic viscosity of propylene-ethylene random copolymer component (ii) ([η]EP): 3.0 dl/g
MFR of propylene-based polymeric material (A-1): 19.8 g/10 minutes
<Method for Producing BCPP-2>
Production was carried out in the same manner as the above-described BCPP-1 except adjusting the hydrogen concentration, the polymerization temperature, and the ethylene/propylene concentration.

(3) BCPP-3
<Physical Properties of BCPP-3>
BCPP-3 in a propylene-based polymeric material (A-1) composed of a propylene homopolymer component (i) and a propylene-ethylene random copolymer component (ii) has the following structure.
Content of propylene homopolymer component (i): 70.3% by weight
Content of monomer units derived from propylene in propylene homopolymer component (i): 100 mol %
Intrinsic viscosity of propylene homopolymer component (i) ([η]P): 0.88 dl/g
Content of propylene-ethylene random copolymer component (ii): 29.7% by weight
Content of monomer units derived from ethylene contained in propylene-ethylene random copolymer component (ii): 33.8% by weight
Content of monomer units derived from propylene contained in propylene-ethylene random copolymer component (ii): 66.2% by weight
Intrinsic viscosity of propylene-ethylene random copolymer component (ii) ([η]EP): 3.3 dl/g
MFR of propylene-based polymeric material (A-1): 26.6 g/10 minutes
<Method for Producing BCPP-3>
Production was carried out in the same manner as the above-described BCPP-1 except adjusting the hydrogen concentration, the polymerization temperature, and the ethylene/propylene concentration.

(4) BCPP-4
<Physical Properties of BCPP-4>
BCPP-4 in a propylene-based polymeric material (A-1) composed of a propylene homopolymer component (i) and a propylene-ethylene random copolymer component (ii) has the following structure.
Content of propylene homopolymer component (i): 68.2% by weight
Content of monomer units derived from propylene in propylene homopolymer component (i): 100 mol %
Intrinsic viscosity of propylene homopolymer component (i) ([η]P): 0.88 dl/g
Content of propylene-ethylene random copolymer component (ii): 31.8% by weight
Content of monomer units derived from ethylene contained in propylene-ethylene random copolymer component (ii): 48.3% by weight
Content of monomer units derived from propylene contained in propylene-ethylene random copolymer component (ii): 51.7% by weight
Intrinsic viscosity of propylene-ethylene random copolymer component (ii) ([η]EP): 2.7 dl/g
MFR of propylene-based polymeric material (A-1): 26.3 g/10 minutes
<Method for Producing BCPP-4>
Production was carried out in the same manner as the above-described BCPP-1 except adjusting the hydrogen concentration, the polymerization temperature, and the ethylene/propylene concentration.

[Propylene Homopolymer (A-2)]
(1) HPP-1
Content of monomer units derived from propylene in propylene homopolymer (A-2): 100 mol %
Intrinsic viscosity of propylene homopolymer (A-2) ([η]P*): 0.92 dl/g
MFR (measured at 230° C., 2.16 kg load): 120 g/10 minutes
(2) HPP-2
Content of monomer units derived from propylene in propylene homopolymer (A-2): 100 mol %
Intrinsic viscosity of propylene homopolymer (A-2) ([η]P*): 1.35 dl/g
MFR (measured at 230° C., 2.16 kgf load): 20 g/10 minutes

[Propylene-Ethylene Random Copolymer (B)]
Propylene-ethylene random copolymers (PER-1 to 7) each having a content of monomer units derived from propylene, a content of monomer units derived from ethylene, a value of density, and a value of MFR given in Table 1 were used as the propylene-ethylene random copolymer (B).

[Ethylene-Octene-1 Copolymer]
Ethylene-octene-1 copolymers (EOR-1 to 2) each having a content of monomer units derived from ethylene, a content of monomer units derived from octene-1, a value of density, and a value of MFR given in Table 1 were used.

[Inorganic Filler]
Talc having an average particle diameter of 2.7 μm was used as an inorganic filler.

Example-1

To 100 parts by weight of BCPP-1 were added 0.05 parts by weight of calcium stearate (produced by NOF Corp.), 0.05 parts by weight of 3,9-bis[2-{3-(3-tert-butyl-4-hydroxy-5-methylphenyl) propion yloxy}-1,1-dimethylethyl]-2,4,8,10-tetraoxaspiro[5.5]undeca ne (SUMILIZER GA80, produced by Sumitomo Chemical Co., Ltd.) and 0.05 parts by weight of bis(2,4-di-tert-butylphenyl)pentaerythritol diphosphite (SONGNOX 626, produced by Songwan) as stabilizers, followed by pelletization with an extruder. Thus, pellets of BCPP-1 were obtained.

The resulting pellets of BCPP-1 in a blend ratio of 95% by weight and PER-1 in a blend ratio of 5% by weight as a propylene-ethylene random copolymer (B) were preliminarily mixed uniformly, and the resulting mixture was charged into a twin screw kneading extruder (manufactured by Toyo Seiki Seisaku-sho, Ltd., 2D25S) and then kneaded and extruded at an extrusion rate of 2.5 kg/hr, a cylinder temperature of 200° C., and a screw speed of 80 rpm. Thus, a polypropylene resin composition was produced. Evaluation results are shown in Table 2.

Example-2

Operations were carried out in the same manner as Example-1 except using PER-2 instead of PER-1. Evaluation results are shown in Table 2.

Example-3

Operations were carried out in the same manner as Example-1 except using PER-3 instead of PER-1. Evaluation results are shown in Table 2.

Example-4

Operations were carried out in the same manner as Example-1 except using PER-4 instead of PER-1. Evaluation results are shown in Table 2.

Comparative Example-1

Operations were carried out in the same manner as Example-1 except using PER-5 instead of PER-1. Evaluation results are shown in Table 2.

Comparative Example-2

Operations were carried out in the same manner as Example-1 except using PER-6 instead of PER-1. Evaluation results are shown in Table 2.

Comparative Example-3

Operations were carried out in the same manner as Example-1 except using PER-7 instead of PER-1. Evaluation results are shown in Table 2.

Comparative Example-4

Operations were carried out in the same manner as Example-1 except using EOR-1 instead of PER-1. Evaluation results are shown in Table 2.

Comparative Example-5

Operations were carried out in the same manner as Example-1 except adjusting the blend ratio of BCPP-1 pellets to 100% by weight and using no PER-1. Evaluation results are shown in Table 2.

Comparative Example-6

Operations were carried out in the same manner as Example-1 except adjusting the blend ratio of BCPP-1 pellets to 98.5% by weight and adjusting the blend ratio of PER-1 to 1.5% by weight. Evaluation results are shown in Table 2.

Example-5

To 100 parts by weight of BCPP-2 were added 0.05 parts by weight of calcium stearate (produced by NOF Corp.), 0.05 parts by weight of 3,9-bis[2-{3-(3-tert-butyl-4-hydroxy-5-methylphenyl)propion yloxy}-1,1-dimethylethyl]-2,4,8,10-tetraoxaspiro [5.5]undeca ne (SUMILIZER GA80, produced by Sumitomo Chemical Co., Ltd.) and 0.05 parts by weight of bis(2,4-di-tert-butylphenyl)pentaerythritol diphosphite (SONGNOX 626, produced by Songwan) as stabilizers, followed by pelletization with an extruder. Thus, pellets of BCPP-2 were obtained.

The resulting pellets of BCPP-2 in a blend ratio of 49% by weight, PER-1 in a blend ratio of 5% by weight as a propylene-ethylene random copolymer (B), and HPP-1 in a blend ratio of 46% by weight as a propylene homopolymer (A-2) were preliminarily mixed uniformly, and the resulting mixture was charged into a twin screw kneading extruder (manufactured by Toyo Seiki Seisaku-sho, Ltd., 2D25S) and then kneaded and extruded at an extrusion rate of 2.5 kg/hr, a cylinder temperature of 200° C., and a screw speed of 80 rpm. Thus, a polypropylene resin composition was produced. Evaluation results are shown in Table 3.

Example-6 and Comparative Examples 7 to 9

Polypropylene resin compositions were produced by the same method as Example-5 except the blend ratios given in Table 2. Evaluation results are shown in Table 3.

Example-7

To 100 parts by weight of BCPP-2 were added 0.05 parts by weight of calcium stearate (produced by NOF Corp.), 0.05 parts by weight of 3,9-bis[2-{3-(3-tert-butyl-4-hydroxy-5-methylphenyl)propion yloxy}-1,1-dimethylethyl]-2,4,8,10-tetraoxaspiro [5.5]undeca ne (SUMILIZER GA80, produced by Sumitomo Chemical Co., Ltd.) and 0.05 parts by weight of bis(2,4-di-tert-butylphenyl)pentaerythritol diphosphite (SONGNOX 626, produced by Songwan) as stabilizers, followed by pelletization with an extruder. Thus, pellets of BCPP-2 were obtained.

The resulting pellets of BCPP-2 in a blend ratio of 48% by weight, HPP-1 in a blend ratio of 22% by weight as a propylene homopolymer (A-2), PER-1 in a blend ratio of 5% by weight as a propylene-ethylene random copolymer (B), EOR-1 in a blend ratio of 4% by weight as an ethylene-α-olefin, EOR-2 in 6% by weight, and talc in 15% by weight were preliminarily mixed uniformly, and the resulting mixture was charged into a twin screw kneading extruder (manufactured by Japan Steel Works, Ltd., TEX44αII) and then kneaded and extruded at an extrusion rate of 70 kg/hr, a cylinder temperature of 200° C., and a screw speed of 300 rpm. Thus, a polypropylene resin composition was produced. Evaluation results are shown in Table 4.

Example-8 and Comparative Examples 10 to 11

Polypropylene resin compositions were produced by the same method as Example-7 except the blend ratios given in Table 2. Evaluation results are shown in Table 3.

Example-7

To 100 parts by weight of BCPP-2 were added 0.05 parts by weight of calcium stearate (produced by NOF Corp.), 0.05 parts by weight of 3,9-bis[2-{3-(3-tert-butyl-4-hydroxy-5-methylphenyl)propion yloxy}-1,1-dimethylethyl]-2,4,8,10-tetraoxaspiro

[5.5]undeca ne (SUMILIZER GA80, produced by Sumitomo Chemical Co., Ltd.) and 0.05 parts by weight of bis(2,4-di-tert-butylphenyl)pentaerythritol diphosphite (SONGNOX 626, produced by Songwan) as stabilizers, followed by pelletization with an extruder. Thus, pellets of BCPP-2 were obtained.

The resulting pellets of BCPP-2 in a blend ratio of 48% by weight, HPP-1 in a blend ratio of 22% by weight as a propylene homopolymer (A-2), PER-1 in a blend ratio of 5% by weight as a propylene-ethylene random copolymer (B), EOR-1 in a blend ratio of 4% by weight as an ethylene-α-olefin, EOR-2 in 6% by weight, and talc in 15% by weight were preliminarily mixed uniformly, and the resulting mixture was charged into a twin screw kneading extruder (manufactured by Japan Steel Works, Ltd., TEX44αII) and then kneaded and extruded at an extrusion rate of 70 kg/hr, a cylinder temperature of 200° C., and a screw speed of 300 rpm. Thus, a polypropylene resin composition was produced. Evaluation results are shown in Table 4.

Example-8 and Comparative Examples 10 to 11

Polypropylene resin compositions were produced by the same method as Example-7 except the blend ratios given in Table 2. Evaluation results are shown in Table 3.

TABLE 1

|  | PER-1 | PER-2 | PER-3 | PER-4 | PER-5 | PER-6 | PER-7 | EOR-1 | EOR-2 |
|---|---|---|---|---|---|---|---|---|---|
| Monomer units derived from propylene (wt %) | 90.3 | 93.1 | 92.1 | 93.2 | 87.2 | 95.9 | 92.9 | — | — |
| Monomer units derived from ethylene (wt %) | 9.7 | 6.9 | 7.9 | 6.8 | 12.8 | 4.1 | 7.1 | 55 | 65 |
| Monomer units derived from octene-1 (wt %) | — | — | — | — | — | — | — | 45 | 35 |
| Density (g/cm$^3$) | 0.874 | 0.876 | 0.879 | 0.876 | 0.859 | 0.888 | 0.876 | 0.857 | 0.873 |
| MFR (230° C., 2.16 kgf load) (g/10 minutes) | 2.2 | 2 | 8.3 | 8 | 2 | 8 | 25 | 2.3 | 10.9 |

TABLE 2

|  |  | Example | | | | Comparative Example | | | | | |
|---|---|---|---|---|---|---|---|---|---|---|---|
|  |  | 1 | 2 | 3 | 4 | 1 | 2 | 3 | 4 | 5 | 6 |
| Blend ratio |  |  |  |  |  |  |  |  |  |  |  |
| (Component A) |  |  |  |  |  |  |  |  |  |  |  |
| BCPP-1 | (wt %) | 95 | 95 | 95 | 95 | 95 | 95 | 95 | 95 | 100 | 98.5 |
| BCPP-2 | (wt %) | — | — | — | — | — | — | — | — | — | — |
| BCPP-3 | (wt %) | — | — | — | — | — | — | — | — | — | — |
| (Component B) |  |  |  |  |  |  |  |  |  |  |  |
| PER-1 | (wt %) | 5 | — | — | — | — | — | — | — | — | 1.5 |
| PER-2 | (wt %) | — | 5 | — | — | — | — | — | — | — | — |
| PER-3 | (wt %) | — | — | 5 | — | — | — | — | — | — | — |
| PER-4 | (wt %) | — | — | — | 5 | — | — | — | — | — | — |
| PER-5 | (wt %) | — | — | — | — | 5 | — | — | — | — | — |
| PER-6 | (wt %) | — | — | — | — | — | 5 | — | — | — | — |
| PER-7 | (wt %) | — | — | — | — | — | — | 5 | — | — | — |
| (Ethylene-α-olefin copolymer) |  |  |  |  |  |  |  |  |  |  |  |
| EOR-1 | (wt %) | — | — | — | — | — | — | — | 5 | — | — |
| Evaluation result |  |  |  |  |  |  |  |  |  |  |  |
| Tensile elongation at break 50 mm/mi | (%) | 430 | 377 | 293 | 305 | 154 | 134 | 128 | 128 | 89 | 78 |
| Izod (23° c.) | (kJ/m$^2$) | 12.9 | 13.0 | 12.2 | 11.2 | 13.7 | 10.6 | 11.9 | 14.2 | 10.1 | 10.2 |
| Izod (−30° c.) | (kJ/m$^2$) | 3.7 | 4.0 | 3.9 | 3.3 | 4.7 | 3.7 | 3.8 | 5.7 | 3.8 | 3.8 |
| Flexural modulus | (MPa) | 1119 | 1129 | 1129 | 1120 | 1133 | 1185 | 1135 | 1184 | 1312 | 1224 |

TABLE 3

| | | Example | | Comparative Example | | |
|---|---|---|---|---|---|---|
| | | 5 | 6 | 7 | 8 | 9 |
| Blend ratio (Component A-1) | | | | | | |
| BCPP-2 | (wt %) | 49 | 49 | 64 | — | — |
| BCPP-3 (Component A-2) | (wt %) | — | — | — | 80 | 62 |
| HPP-1 | (wt %) | 46 | 38 | 36 | 20 | 33 |
| HPP-2 (Component B) | (wt %) | — | 8 | — | — | — |
| PER-1 | (wt %) | 5 | 5 | — | — | 5 |
| Evaluation result | | | | | | |
| Tensile elongation at break 10 mm/mi | (%) | 586 | 718 | 34 | 778 | 757 |
| Izod (23° c.) | (kJ/m$^2$) | 8.1 | 9.4 | 8.6 | 12.4 | 10.7 |
| Izod (−30° c.) | (kJ/m$^2$) | 3.6 | 4.3 | 5.0 | 3.2 | 2.5 |
| Flexural modulus | (MPa) | 1055 | 1027 | 1099 | 991 | 984 |

TABLE 4

| | | Example | | Comparative Example | |
|---|---|---|---|---|---|
| | | 7 | 8 | 9 | 10 |
| Blend ratio Component (A-1) | | | | | |
| BCPP-2 | (wt %) | 48 | | 51 | |
| BCPP-4 Component (A-2) | (wt %) | | 45 | | 60 |
| HPP-1 | (wt %) | 22 | 13 | 24 | 15 |
| HPP-2 Component (B) | (wt %) | | 15 | | 3 |
| PER-1 (Others) | (wt %) | 5 | 5 | | |
| EOR-1 | (wt %) | 4 | — | 4 | — |
| EOR-2 | (wt %) | 6 | 7 | 6 | 7 |
| Talc | (wt %) | 15 | 15 | 15 | 15 |
| Evaluation result | | | | | |
| Tensile elongation at break 50 mm/mi | (%) | 132 | 495 | 30 | 69 |
| 10 mm/mi | | 399 | 620 | 33 | 133 |
| Izod (23° c.) | (kJ/m$^2$) | 54.5 | 49.1 | 6.4 | 16.1 |
| Izod (−30° c.) | (kJ/m$^2$) | 5.5 | 7.8 | 5.1 | 6.6 |
| Flexural modulus | (MPa) | 1420 | 1404 | 1515 | 1552 |

INDUSTRIAL APPLICABILITY

According to the present invention, it is possible to obtain a polypropylene resin composition capable of affording a molded article good in rigidity, impact resistance and tensile elongation at break, as well as a molded article good in rigidity, impact resistance and tensile elongation at break.

The invention claimed is:

1. A polypropylene resin composition comprising 95-98 wt % of a propylene-based material (A) defined below and 2-5 wt % of a propylene-ethylene random copolymer (B) defined below, where the combined amount of the propylene-based material (A) and the propylene-ethylene random copolymers (B) is taken as 100 wt %, the propylene-based material (A) being a material comprising 50-100 wt % of a propylene-based polymeric material (A-1) composed of a propylene homopolymer component (i) and a propylene-ethylene random copolymer component (ii) produced by multistage polymerization and 0-50 wt % of a propylene homopolymer (A-2), where the combined amount of the propylene-based polymeric material (A-1) and the propylene homopolymer (A-2) is taken as 100 wt %, the propylene-based polymeric material (A-1) satisfies requirements (1) and (2) defined below, and the content of the propylene-ethylene random copolymer component (ii) in the propylene-based material (A) is 5-35 wt %, requirement (1):

the content of the propylene homopolymer component (i) in the propylene-based polymeric material (A-1) is chosen from the range of 55-90 wt % and the content of the propylene-ethylene random copolymer component (ii) is chosen from the range of 10-45 wt % (the sum total of the content of propylene polymer component (i) and the content of propylene-ethylene random copolymer component (ii) is taken as 100 wt %), requirement (2):

the propylene-ethylene random copolymer component (ii) of the propylene-based polymeric material (A-1) comprises more than 40 wt % but not more than 80 wt % of monomer units derived from ethylene and not less than 20 wt % but less than 60 wt % of monomer units derived from propylene (the overall weight of the propylene-ethylene random copolymer component (ii) is taken as 100 wt %), the propylene-ethylene random copolymer (B) comprises 88-94 wt % of monomer units derived from propylene and 6-12 wt % of monomer units derived from ethylene, where the overall weight of the propylene-ethylene random copolymer component (B) is taken as 100 wt %, and the propylene-ethylene random copolymer (B) has a melt flow rate of 2-10 g/10 minutes as measured at 230° C. under a load of 2.16 kgf.

2. The polypropylene-based resin composition according to claim 1, wherein the propylene-ethylene random copolymer (B) has a density of 0.87-0.88 g/cm$^3$.

3. A molded article made of the polypropylene resin composition according to claim 1.

4. A molded article made of the polypropylene resin composition according to claim 2.

* * * * *